United States Patent
Manfredotti et al.

(10) Patent No.: US 7,582,032 B2
(45) Date of Patent: Sep. 1, 2009

(54) ANTI-VIBRATORY DEVICE WITH ROTARY COMPENSATION WEIGHTS

(75) Inventors: Thomas Manfredotti, La Colle sur Loup (FR); Damien Sequera, Nimes (FR)

(73) Assignee: Eurocopter, Marignane (FR)

( * ) Notice: Subject to any disclaimer, the term of this patent is extended or adjusted under 35 U.S.C. 154(b) by 507 days.

(21) Appl. No.: 10/522,516

(22) PCT Filed: Mar. 1, 2004

(86) PCT No.: PCT/FR2004/000477
§ 371 (c)(1),
(2), (4) Date: Jan. 17, 2006

(87) PCT Pub. No.: WO2004/087343
PCT Pub. Date: Oct. 14, 2004

(65) Prior Publication Data
US 2006/0135302 A1  Jun. 22, 2006

(30) Foreign Application Priority Data
Mar. 20, 2003  (FR) ................................... 03 03412

(51) Int. Cl.
*F16H 7/20* (2006.01)
(52) U.S. Cl. ......................................... 474/87; 244/1 N
(58) Field of Classification Search .................... 474/70, 474/62, 81, 84–87, 117–118, 137; 118/378, 118/387; 74/61, 87, 570.1; 244/17.11, 17.13, 244/4 R, 1 R, 1 N
See application file for complete search history.

(56) References Cited

U.S. PATENT DOCUMENTS

| 5,067,358 A | * | 11/1991 | Ancrenaz ....................... 74/61 |
| 5,584,375 A | * | 12/1996 | Burgess et al. .............. 198/751 |
| 5,903,077 A | * | 5/1999 | Garnjost et al. ............... 310/81 |
| 6,212,445 B1 | * | 4/2001 | Barba et al. .................. 700/280 |
| 6,592,481 B2 | * | 7/2003 | Sato et al. .................... 474/134 |

FOREIGN PATENT DOCUMENTS

| EP | 0 400 510 | 12/1990 |
| WO | WO 96/06290 | 2/1996 |

OTHER PUBLICATIONS

Bird, John. Engineering Mathematics, Fourth Edition. Copyright 2001. p. 140.*

* cited by examiner

*Primary Examiner*—Bradley T King
*Assistant Examiner*—Anna Momper
(74) *Attorney, Agent, or Firm*—Young & Thompson

(57) ABSTRACT

An anti-vibratory device with rotary compensation weights includes two sets of two identical rotors with respective eccentric compensation weights, the units being symmetrically disposed in relation to an axis of symmetry and the axes of rotation of the rotors being parallel between themselves and orthogonal in relation to the axis of symmetry; and a rotational drive system for the rotors. Advantageously, the device includes controllable mobile equipment carrying the drive system and being able to slide along the axis of symmetry in order to drive the dephasing of the rotors with eccentric compensation weights associated with the sets.

20 Claims, 4 Drawing Sheets

ANTI-VIBRATORY DEVICE WITH ROTARY COMPENSATION WEIGHTS

BACKGROUND OF THE INVENTION

1. Field of the Invention

The present invention relates to an antivibration device.

More particularly, although not exclusively, in its preferred application, the device of the invention is designed for mounting on board of aircraft, in particular in the cabin of a rotary wing aircraft such as a helicopter, but it could naturally be used for any other application where there is a desire to reduce or even eliminate vibration generated by a moving body.

2. Description of the Related Art

The problem of controlling vibration in a helicopter cabin is described in detail in the introduction of French patent No. 2 770 825 (U.S. Pat. No. 6,067,853). In short, the main existing vibration is due to rotation of the main rotor for providing lift and propulsion, and to the air flow along the helicopter fuselage.

In an attempt to absorb this vibration that appears in the cabin, resonator antivibration devices have been proposed that act by resonance at a predetermined frequency in order to reduce the vibration present at said frequency. Nevertheless, their effectiveness is limited since they act only on vibration having the predetermined frequency, and not on vibration at other frequencies.

In addition, devices of that type become ineffective when the vibration that is to be reduced changes frequency.

The antivibration device of the type having a controllable resonator as described in that prior patent enables vibration at varying frequency to be treated. For that purpose, the resonator is used as an actuator in a closed loop system, and vibration measurements from sensors placed on the helicopter are analyzed by a control unit which delivers the control signal to each actuator in such a manner as to minimize the levels of vibration at the measurement points. Although giving advantageous results, that antivibration device presents a certain number of drawbacks such as heavy weight (about 10 kilograms (kg) for each resonator), which is always penalizing in the field of aviation, and high energy consumption if it is to be effective in treating the levels of vibration that are to be encountered in helicopters.

To remedy those drawbacks, antivibration devices of another design have been developed that make use of a rotary balance weight for creating a force that opposes the vibration that is to be reduced. U.S. Pat. No. 5,903,077 and European patent No. 0 337 040 teach such devices.

The antivibration device or modular vibration force generator described in that US patent comprises modules or assemblies each having a motor and gearing driving a pair of co-operating toothed rotors having respective eccentric masses such that the center of gravity of each rotor is not situated on its axis of rotation. Thus, the rotation of each rotor produces a rotary unbalance and, since the rotors are both disposed in the same plane, they produce unbalance that is identical but turning in opposite directions. This results in a sinusoidal force in the direction that is perpendicular to the plane containing the axes of rotation of the rotors, since the components of the unbalances within this plane are opposite and therefore cancel.

In general, the generator comprises two identical modules that are associated to obtain an adjustable resultant force of amplitude that depends on the phase difference between the modules and of frequency equal to the speed of rotation of the rotors.

A command unit controls and regulates the phase difference between the modules and the speed of rotation of the rotors so that vibration of any frequency can be reduced.

The antivibration device described in the above-mentioned European patent comprises in analogous manner two identical assemblies, each comprising two rotors with respective eccentric flyweights, the two assemblies being disposed symmetrically about an axis of symmetry, and said eccentric flyweight rotors having axes that are parallel to one another and orthogonal to the axis of symmetry are rotated by respective motors that are servo-controlled to rotate at the same speed. Such a device can thus easily adapt to fluctuations in amplitude, in phase, and in frequency of the vibration that is to be attenuated.

Although those antivibration devices having rotary unbalance weights provide considerable progress in treating vibration, they nevertheless present drawbacks, and in particular:

an increase in the level of vibration (instead of a decrease) in the event of a breakdown. Should the motors of the two modules cease to rotate at the same speed, for any reason whatsoever, the resulting vibratory force is no longer under control, thereby leading immediately to greatly degraded comfort, which becomes significantly worse than it would be in the absence of any treatment;

a control unit that is quite complex since it needs to synchronize the modules while the motors are getting up to speed, thereby complicating the control algorithms and correspondingly increasing the risk of a breakdown; and relatively high cost because of the large number of expensive components: several motors, sets of gearing, and a control unit that is complex since it is required to synchronize the speeds of the motors and servo-control their phase difference in order to implement an active system.

BRIEF SUMMARY OF THE INVENTION

An object of the present invention is to remedy those drawbacks. Moreover, in order to be installed in a aircraft, such as a helicopter, the dimensions and the weight of the antivibration device shall be reduced.

To this end, the antivibration device of the type comprises at least two sets each comprising two identical rotors having respective eccentric flyweights, said sets being disposed symmetrically about an axis of symmetry and the axes of rotation of said rotors being parallel to one another and orthogonal to said axis of symmetry, and a drive system for setting said rotors into rotation. According to the invention, the device is remarkable:

in that it comprises controllable moving equipment carrying said drive system and capable of sliding along said axis of symmetry to vary the phase offset between the eccentric flyweight rotors of the sets; and in that said drive system comprises a single motor for rotating said rotors, having its axis disposed perpendicularly to said axis of symmetry, and driving an endless connection passing around said rotors so that the lengths of the strands of the endless connection passing through said sets are equal.

Thus, by means of the invention, a stable vibratory force, of determined amplitude and direction, can be generated by the device merely by moving the controllable moving equipment carrying the single motor along the axis of symmetry, thereby acting via said endless connection to progressively change the phase difference between the rotors in each set so as to bring the eccentric flyweights to the desired position. When the single motor is rotating and the controllable moving equipment is stationary, the two symmetrical strands passing through the sets present displacement speeds that are identical and of the same modulus, but that are in opposite directions since, by symmetry, one of the strands goes through its set while going away from the single motor while the other strand is going towards it. As a result, when the moving equipment to which said single motor is connected is displaced at a given speed, it imparts its own displacement movement to the two strands, so the displacement speed of the moving equipment is added to the speed of one of the strands while it is subtracted from the speed of the other strand. As a result, while the moving equipment is being displaced, the two rotors in a given assembly are driven at a speed that is different from that of the rotors in the other assembly, thereby leading to a progressive change in the phase offset of the eccentric flyweights.

This makes it easy to modulate the amplitude and the direction of the resulting vibratory force to be delivered as a function of the vibration that is to be reduced, by changing the phase offsets of said eccentric flyweights, while the frequency thereof is determined by the speed of rotation of the single motor.

In addition, since the drive system has a single motor, all the rotors rotate at the same speed that is imposed by the single motor. Consequently, the resulting vibratory force is very stable and thoroughly controlled. In addition, in the event of the endless connection rupturing or in the event of the single motor breaking down, all four rotors stop simultaneously, so the vibration level of the structure then rises to its initial value without any antivibration device, but cannot exceed that value, as is not the case with the above-described prior art devices.

In addition, the final phase offset obtained after the moving equipment has stopped depends on the length of time said equipment was moving, i.e. on its actual displacement along the axis of symmetry. Advantageously, the phase offset $\phi$ between the eccentric flyweight rotors disposed symmetrically facing each other about the axis of symmetry is equal to 2d/r, where d corresponds to the linear displacement of said moving equipment along said axis of symmetry, and r corresponds to the identical winding radius of the endless connection about the centers of said rotors.

In particular, the linear displacement stroke of said moving equipment is defined by two extreme positions, a first position in which the phase offset between the eccentric flyweight rotors is zero, and a second position in which the phase offset is equal to 180°.

The resulting vibratory force can thus vary from a maximum amplitude when the phase offset between the flyweight rotors of the first assembly and the flyweight rotors of the second assembly is zero, to a zero amplitude when the phase offset between them is 180°, while the frequency of said vibratory force is equal to the common speed of rotation of the rotors driven by the single motor.

Furthermore, the device preferably includes at least one servo-motor for controlling the position of said moving equipment, and a plurality of sensors for measuring the positions of said rotors in order to determine the phase offset between said sets, and a regulation and servo-control relationship for the rotation of said single motor.

In a preferred embodiment, said controllable moving equipment is a carriage sliding along said axis of symmetry and carrying said single motor. In addition, said endless connection is a belt that is wound around pulleys that are mounted on the axes of said rotors and of said single motor, the pulleys all being contained in a single plane. It should be observed that the drive system without servo-control constituted by a single motor driving a belt and pulleys is very simple, thereby providing a high degree of reliability and requiring little maintenance.

In order to avoid slip appearing between the endless connection and the rotors, said belt is a cog belt and co-operates with corresponding teeth formed on said pulleys.

Furthermore, said controllable moving equipment also includes at least one tensioning wheel for tensioning said endless connection.

In a preferred embodiment, both sets of two rotors are carried by a frame suitable for being secured to a vibrating structure, said controllable moving equipment being slidably mounted on said frame to slide along the axis of symmetry of the two sets.

In addition, for each set of rotors, said antivibration device comprises an intermediate rotary wheel co-operating with said endless connection to provide contrarotating drive of the two rotors, the two intermediate rotary wheels being arranged on the frame and disposed respectively on either side of said axis of symmetry.

BRIEF DESCRIPTION OF THE DRAWING FIGURES

The figures of the accompanying drawings show clearly how the invention can be implemented. In these figures, identical references designate elements that are similar.

DETAILED DESCRIPTION OF THE PREFERRED EMBODIMENT

Figure 1:
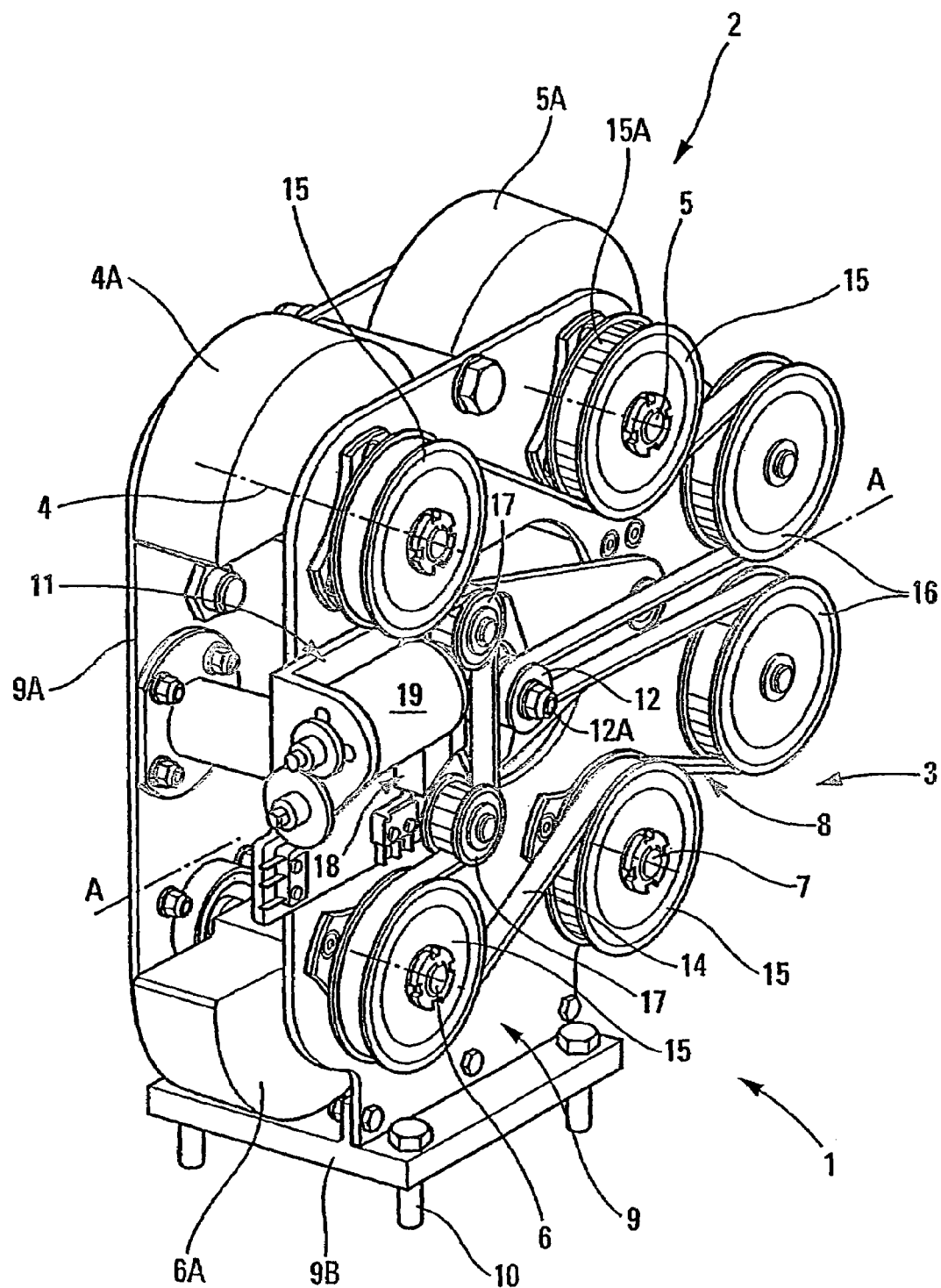
FIG. 1 is a perspective view of an embodiment of an antivibration device in accordance with the invention.

The antivibration device 1 shown in FIG. 1 comprises two identical modules or sets 2 and 3 each comprising two rotors or rotary shafts respectively referenced 4, 5 and 6, 7, and associated with respective flyweights 4A, 5A and 6A, 7A that are eccentric relative to the axes of rotation of the rotors. In this embodiment, the two sets 2, 3 are disposed in a common vertical plane and are separated from each other about an axis of symmetry A that is horizontal. The axes of the rotors 4, 5, 6, and 7 are parallel to one another (horizontal in this example) and orthogonal to the axis of symmetry A of the identical sets 2, 3 such that the rotors are opposite in pairs, the rotors 4, 5 and 6, 7 being at equal distances from an axis of symmetry B (vertical in FIGS. 2 to 6) that is orthogonal to the axis of symmetry A.

A drive system 8 serves to drive the rotors 4, 5, 6 and 7.

In addition, the rotors of said sets are carried, via bearings (not shown), by a frame 9 constituted by an assembly of plates 9A, and having a base plate 9B suitable for being secured by fasteners 10 to a vibrating structure of the helicopter (not shown).

According to the invention, in order to vary the phase offset between the eccentric flyweight rotors and thereby modulate the amplitude of the resultant vibratory force as a function of the vibration that is to be "treated", the device 1 includes moving equipment 11 carrying the drive system 8 and capable of sliding along the axis of symmetry A, the drive system 8 being common to all of the rotors, with the two rotors 4, 5 and 6, 7 of each set rotating in opposite directions relative to each other so that the two rotors 4 and 6 facing each other symmetrically turn in the same direction while the other two rotors 5 and 7 turn in the opposite direction.

In particular, the common drive system 8 comprises a single motor 12 disposed between the two sets with the axis of rotation of its outlet shaft 12A being parallel to the rotors 4, 5, 6, and 7 and perpendicular to the axis of symmetry A. The single motor 12 drives an endless connection 14 forming a closed loop that passes around the rotors in order to set them into motion. In this embodiment, the endless connection 14 is constituted by a belt which is wound around pulleys 15 mounted on the axes of the rotors. The pulleys are all identical in diameter so that relative to the axis of symmetry of the device, the length of the strand 14A of the belt 14 that passes through the set 2 is equal to the length of the strand 14B that passes through the set 3.

Naturally, the pulleys 15 are all contained in the same vertical plane. To avoid rotation occurring with slip, the belt 14 is a cog belt and co-operates with corresponding teeth 15A formed at the peripheries of the pulleys 15. In a variant, it is possible to use a drive system using a chain and sprocket wheels.

As shown in FIG. 1, the cog belt 14 is also wound around two intermediate wheels 16 such as free pulleys, that are identical to the preceding pulleys, and disposed respectively on either side of the axis of symmetry A. These two intermediate pulleys 16 are thus situated between the single motor 12 and the respective sets 2, 3 and they are supported by the frame 9. Each of them, in connection with the corresponding set or module, enables the two rotors 4, 5 or 6, 7 in a set to be turned in opposite directions to each other via the corresponding pulleys. In addition, the controllable moving equipment 11 has two identical tensioning wheels or pulleys 17 disposed symmetrically relative to each other about the axis of symmetry A so as to enable the tension of the belt 14 to be adjusted.

In the embodiment shown, the controllable moving equipment 11 comprises a carriage 18 disposed between the two sets 2, 3 and capable of sliding in the vertical plane of the device along the axis of symmetry A. The carriage 18 is structurally connected in slidable manner to the frame via a slideway or like connection (not shown), and carries the tensioning wheels 17 together with the single motor 12 which drives the belt 14. Movement of the carriage along the axis of symmetry A is preferably controlled by a servo-motor 19 provided between the frame 9 and the carriage 18 and forming part of a device for controlling the frequency and the amplitude of the overall vibratory force generated by the antivibration device 1. This control device is constituted by the servo-motor 19 servo-controlling the position of the carriage 18 as a function of a first electrical signal, e.g. in order to control the amplitude of the vibratory force generated by the device 1, by a plurality of sensors (not shown) measuring the angular positions of the rotors in each of the sets 2, 3 so as to enable the phase offset that needs to be produced between the sets to be determined as a function of the vibration that is to be absorbed, and by a relationship for regulating and servo-controlling the speed of rotation of the single motor 12 as a function of a second signal for controlling frequency.

In the example shown, the phase offset between the rotors 4, 6 and 5, 7 having eccentric flyweights 4A, 6A and 5A, 7A of the two sets disposed symmetrically facing each other about the axis of symmetry A is given by the relationship $$\varphi = 2\frac{d}{r}$$

where $\varphi$ is the phase offset, d corresponds to the linear stroke of the carriage along the axis of symmetry, and r corresponds to the identical winding radius of the endless connection around the centers of the identical rotors.

The operation of the antivibration device 1, and in particular of the drive system 8 and of the moving equipment 11 are described below with reference to FIGS. 2 to 6.

Firstly, in these figures, only one tensioning pulley or wheel 17 for the belt 14 is shown, in which case it is disposed on the axis of symmetry A and is connected to the moving equipment 11. The carriage 18 of the moving equipment is represented by a rectangle. It is assumed that the single motor 12 of the drive system 8 rotates in the direction S shown in FIG. 2 so that the belt 14 winds around the free pulleys 16 in the counterclockwise direction. The phase offset $\varphi$ between the facing rotors of the sets is zero, with all four eccentric flyweights 4A, 5A, 6A, and 7A of the rotors being in the same angular position, and in this example the carriage 18 is then in one of its two end-of-stroke limit positions on the right of FIG. 2.

When the single motor 12 rotates (at a constant speed in nominal operation), the two strands of the belt 14, respectively the top strand 14A (above the axis of symmetry A) and the bottom strand 14B (beneath the axis of symmetry A) are driven at velocities having the same modulus V, but in directions that are opposite.

The rotors 4-5 and 6-7 of the two set 2, 3 are driven at identical speed, and within their sets they turn in opposite directions, but in directions that are identical for the pairs of rotors of the sets that are disposed symmetrically about the axis A, i.e. the pairs of rotors 4-6 and 5-7.

Figure 3:
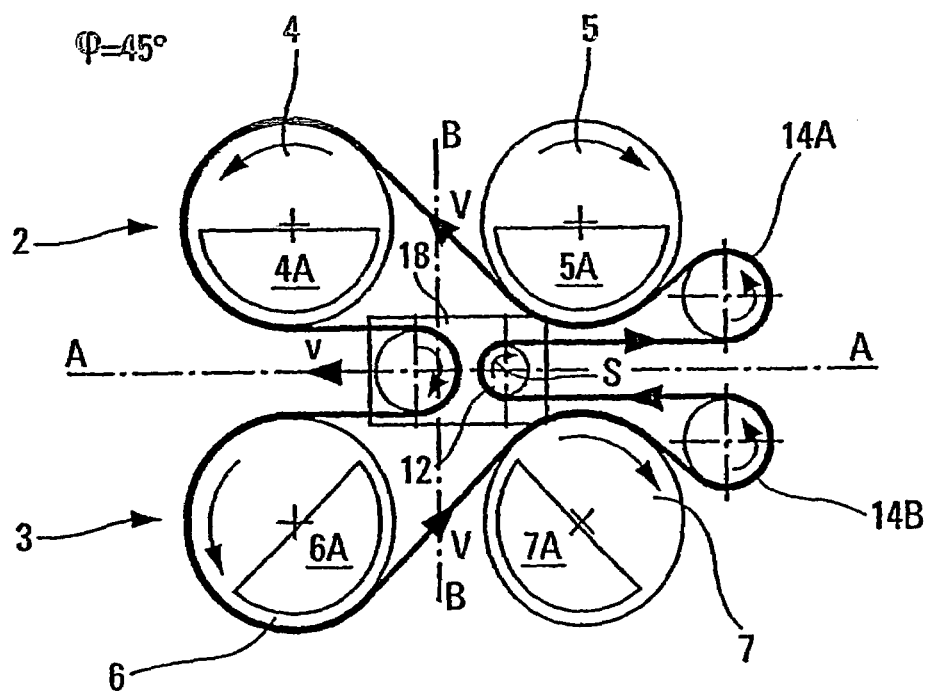

By way of example, in order to obtain a phase offset $\varphi$ of 45° provided by the sensors between the two facing pairs of rotors, the carriage 18 of the moving equipment 11 moves at a speed v to the left under drive from the servo-motor 19, as shown in FIG. 3, the carriage moving along the axis of symmetry A and imparting its movement in translation to the two strands 14A and 14B of the belt 14. Its tension remains constant, and thus identical, since the length of its path remains unchanged (the displacement of the single motor compensates for the displacement of the carriage). The respective speeds of the strands become V−v for the top strand 14A, since it is pulled by the sliding of the carriage 18, and V+v for the bottom strand 14B, since it is pushed by said carriage.

Thus, since the two rotors 4-5 of the set 2 are driven at a speed that is different from that of the rotors 6-7 of the set 3, it follows that the phase offset between the eccentric flyweights 4A, 5A, 6A, and 7A will change progressively, and thus that there will result a vibratory force of intensity and direction acting on the device 1 that are determined to correspond to the vibration of the structure that is to be overcome.

Figure 2:
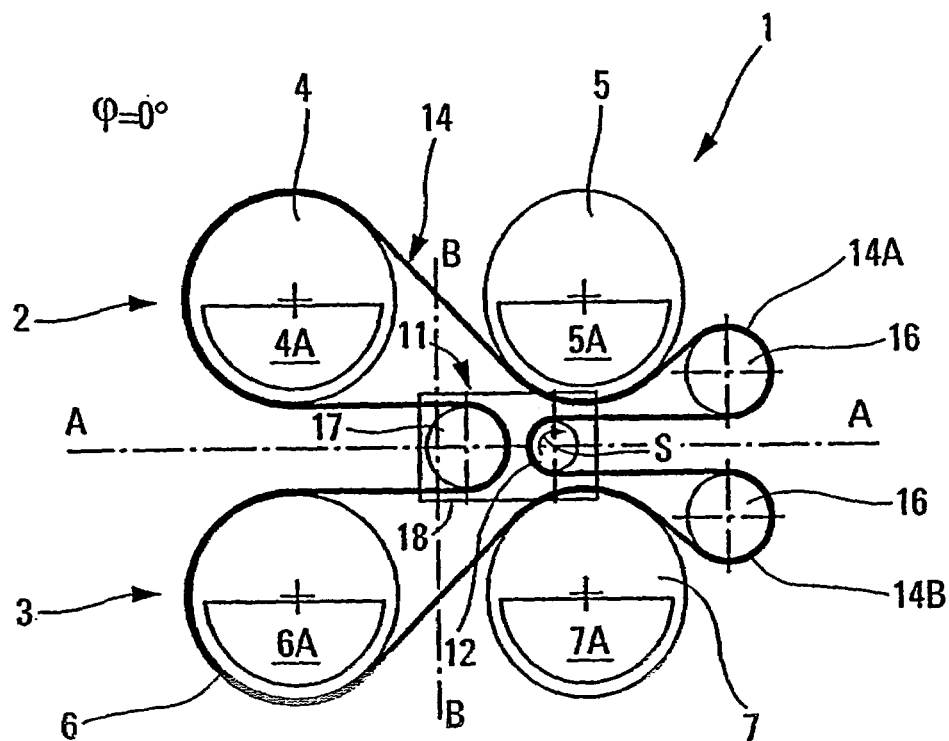
FIGS. 2 to 6 are diagrams showing different positions that can be occupied by the antivibration device following action on the moving equipment and the drive system, in order to reduce vibration.

In particular, in the present example, when the two rotors 4-5 of the top set 2 are in the same reference position as shown in FIG. 2 (their eccentric flyweights 4A and 5A still being symmetrical relative to each other about the vertical axis B in the figures), the two rotors 6-7 of the bottom set 3 will have turned through an additional 45°, because of the different speeds V+v and V−v (their eccentric flyweights 6A and 7A still being symmetrical to each other about the vertical axis B).

The phase offset φ of 45° obtained between the pair 4, 6 and the pair 5, 7 of rotors that are symmetrical about the axis A, and thus of the eccentric flyweights, delivers the amplitude and the direction of the resulting vibratory force from the device 1, whereas its frequency is a function of the speed of rotation of the single motor 12.

Figure 4:
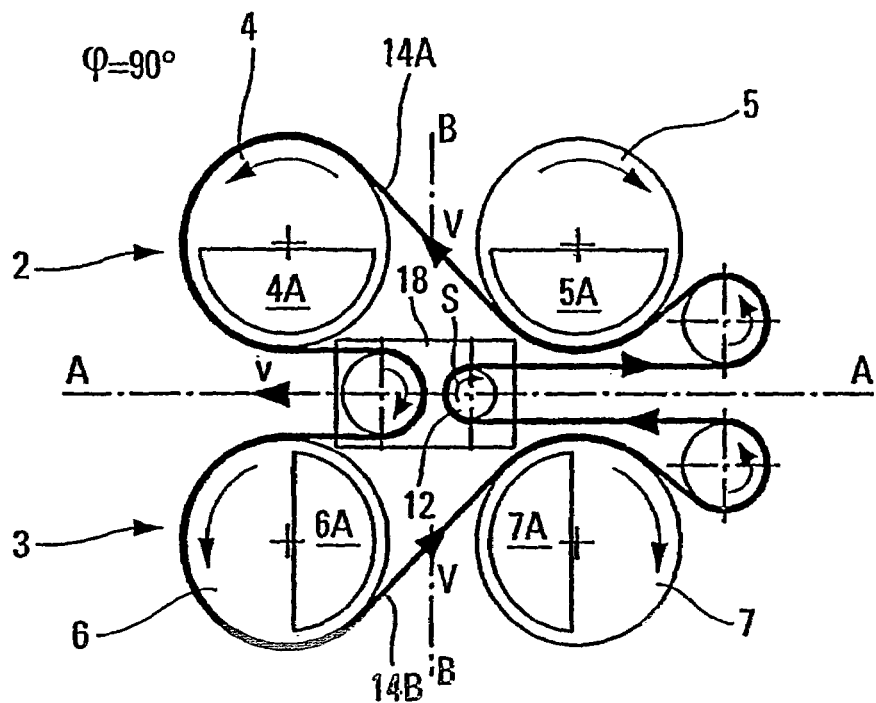
Figure 5:
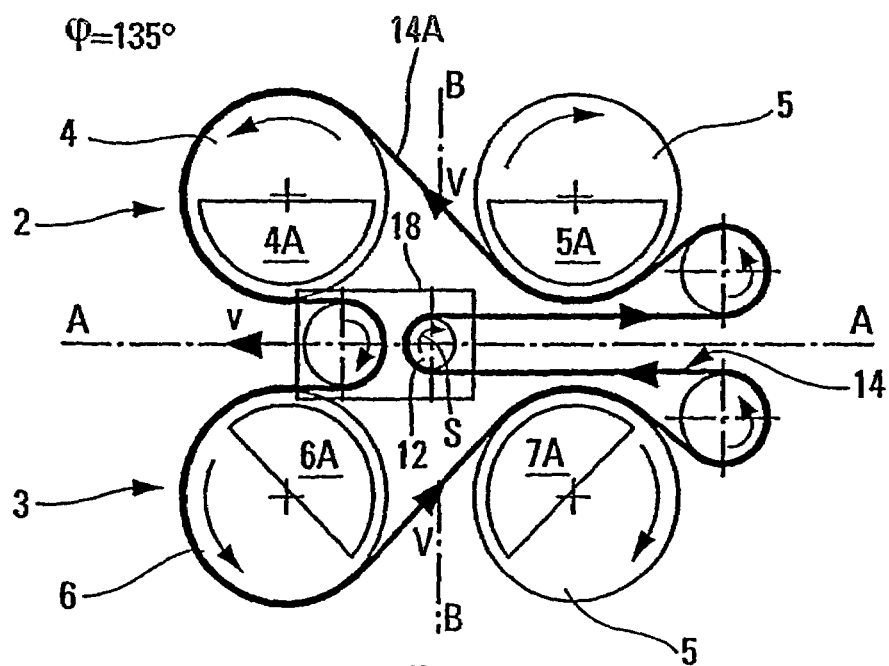
Figure 6:
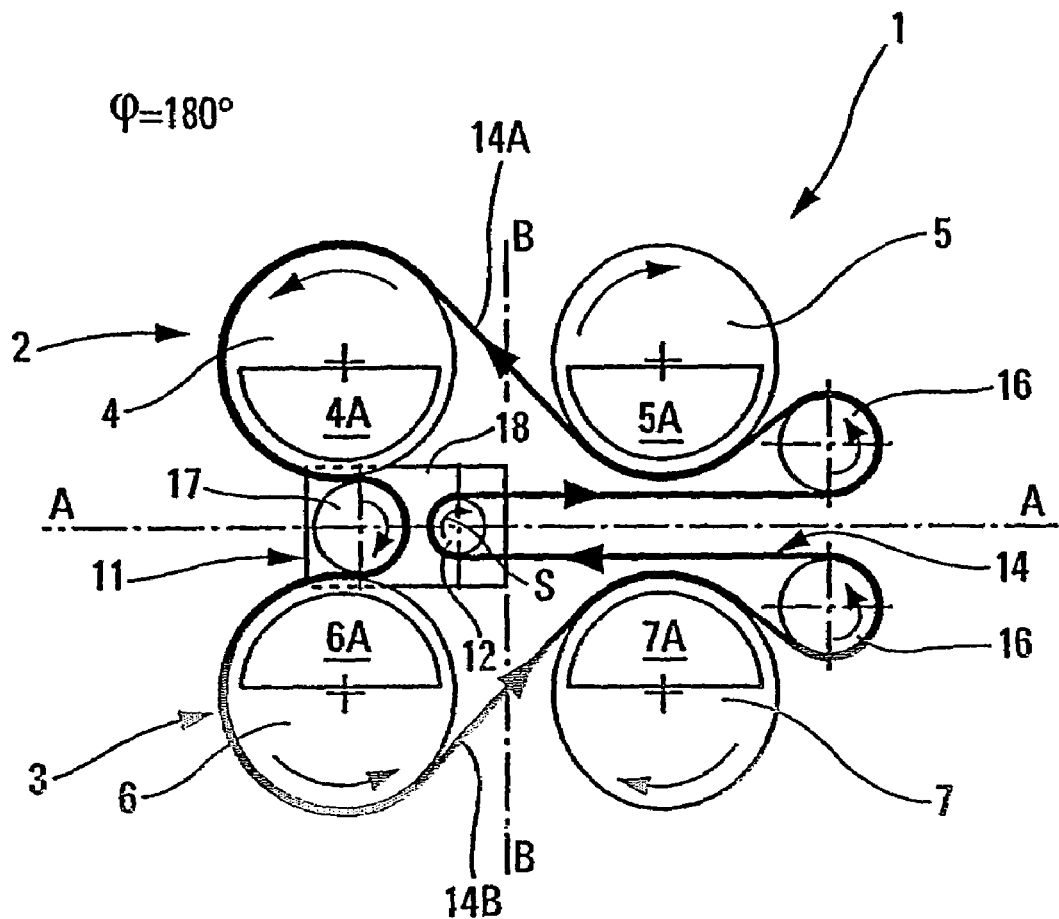

FIGS. 4 to 6 show examples of particular phase offsets for the antivibration device 1, respectively equal to 90°, 135°, and 180°, due to the carriage moving to the left along the axis A, with the phase offset of 180° corresponding to the other end-of-stroke limit position of the carriage, to the left in FIG. 6. The operation of the eccentric flyweight rotors in the sets 2, 3 for achieving these different phase offsets is not described in greater detail since it stems in obvious manner from the figures. Naturally, any other phase offset value in the range 0° to 180° can be obtained, with only particular offset values being shown.

It will thus be understood that the device 1 of the invention enables any resultant vibratory force (in amplitude and orientation) to be delivered between the two extreme values for the phase offset (0 to 180°) that correspond to the two limit strokes of the carriage, i.e. lying between a zero vibratory force when the influence of the eccentric flyweights cancels and a maximum vibratory force when the influence of the four eccentric flyweights is cumulative.

In a variant, the control device can estimate the phase offsets between the sets or modules on the basis of the actual position of the carriage (and not from sensors associated with the rotors) since each position of the carriage along the axis A corresponds to a particular phase offset φ. Prior calibration associating the stroke of the carriage with the phase offset between the sets is then required.

Similarly, although the servo-control operations described are of the electrical type, it is possible to envisage using servo-control operations of the mechanical, fluidic, optical, or other types, depending on the particular constraints of a given application.

Furthermore, if the antivibration device is used on its own with a predetermined level of vibratory force, it is possible to simplify the carriage control device by replacing the servo-motor with a screw-and-nut type connection for adjusting the position of the carriage along the axis, and by means of a lock-nut.

The direction along which the vibratory force from each set acts can be adjusted by shifting the positions of the centers of gravity of the two eccentric flyweight rotors. If the forces from each of the two sets act in the same direction, then the overall resulting vibratory force from the device in said direction is of an amplitude that depends on the phase offset between the sets. Such shifting of the unbalance generated by the flyweights can be performed manually by predetermined adjustments of the positions of the flyweights, or automatically by a specific servo-control system.

The invention claimed is:

1. An antivibration device configured for an airframe or a helicopter, comprising:
at least two sets (2, 3) each comprising two identical rotors (4, 5; 6, 7) having respective eccentric flyweights (4A, 5A; 6A, 7A), said sets being disposed symmetrically about an axis of symmetry, and axes of rotation of said rotors being parallel to one another and orthogonal to said axis of symmetry;
a drive system (8) for setting said rotors into rotation;
controllable moving equipment (11) carrying said drive system (8) and capable of sliding along said axis of symmetry to vary a phase offset between the eccentric flyweight rotors of the sets, the phase offset being a function of a vibration that needs to be absorbed, said drive system (8) comprising a single motor (12) for rotating said rotors, having its axis disposed perpendicularly to said axis of symmetry, and driving an endless connection passing around said rotors (4, 5; 6, 7) so that a plurality of lengths of strands of the connection passing through said sets are equal,
wherein the antivibration device is fitted to the airframe or the helicopter.

2. The device according to claim 1, wherein a phase offset φ between the eccentric flyweight rotors disposed symmetrically facing each other (4, 6; 5, 7) about the axis of symmetry is equal to 2d/r, where d corresponds to the linear displacement of said moving equipment (11) along said axis of symmetry, and r corresponds to an identical winding radius of the endless connection about the centers of said rotors, the phase offset φ being a function of the vibration that needs to be absorbed.

3. The device according to claim 2, wherein the linear displacement stroke of said moving equipment (11) is defined by two extreme positions, a first position in which the phase offset between the eccentric flyweight rotors is zero, and a second position in which the phase offset is equal to 180°.

4. The device according to claim 1, wherein a linear displacement stroke of said moving equipment (11) is defined by two extreme positions, a first position in which the phase offset between the eccentric flyweight rotors is zero, and a second position in which the phase offset is equal to 180°.

5. The device according to claim 1, wherein said device includes at least one servo-motor (19) for servo-controlling a position of said moving equipment (11), a plurality of sensors measuring the positions of said rotors for a purpose of calculating the phase offset between said sets, and a relationship for regulating and servo-controlling rotation of said single motor (12).

6. The device according to claim 1, wherein said controllable moving equipment (11) is a carriage (18) sliding along said axis of symmetry and supporting said single motor (12).

7. The device according to claim 1, wherein said endless connection (14) is a belt that winds around a plurality of pulleys (15) that are mounted on the axes of said rotors, and of said single motor, which pulleys are contained in a common plane.

8. The device according to claim 7, wherein said belt (14) is a cog belt and co-operates with corresponding teeth (15A) formed on said pulleys (15).

9. The device according to claim 1, wherein said controllable moving equipment (11) also includes at least one tensioning wheel (17) for tensioning said endless connection (14).

10. The device according to claim 1, wherein the two sets (2, 3) are carried by a frame (9) suitable for being secured to a vibrating structure, said controllable moving equipment (11) being slidably mounted on said frame (9) to slide along the axis of symmetry of the two sets (2, 3).

11. The device according to claim 1, wherein for each set (2, 3) of rotors, it includes an intermediate rotary wheel (16) co-operating with said endless connection (14) to ensure that the two rotors are driven in contrarotation, the two rotary wheels (16) being arranged on a frame (9) and being disposed respectively on either side of said axis of symmetry.

12. The device according to claim 1, wherein the single motor (12) is disposed between the two sets (2,3).

13. An antivibration device configured for an airframe or a helicopter, comprising:
two sets (2, 3) each comprising two identical rotors (4, 5; 6, 7) having respective eccentric flyweights (4A, 5A; 6A, 7A), said sets being disposed symmetrically about an axis of symmetry, and axes of rotation of said rotors being parallel to one another and orthogonal to said axis of symmetry;

a drive system (8) for setting said rotors into rotation;

controllable moving equipment (11) carrying said drive system (8) and capable of sliding along said axis of symmetry to vary a phase offset between the eccentric flyweight rotors of the sets, the phase offset being a function of a vibration that needs to be absorbed, said drive system (8) comprising a single motor (12) for rotating said rotors, the single motor (12) being disposed between the two sets and having its axis disposed perpendicularly to said axis of symmetry, and driving an endless connection passing around said rotors (4, 5; 6, 7) so that a plurality of lengths of strands of the connection passing through said sets are equal, wherein the antivibration device is fitted to the airframe or the helicopter.

14. The device according to claim 13, wherein a phase offset $\phi$ between the eccentric flyweight rotors disposed symmetrically facing each other (4, 6; 5, 7) about the axis of symmetry is equal to 2d/r, where d corresponds to the linear displacement of said moving equipment (11) along said axis of symmetry, and r corresponds to an identical winding radius of the endless connection about the centers of said rotors, the phase offset $\phi$ being a function of the vibration that needs to be absorbed.

15. The device according to claim 13, wherein a linear displacement stroke of said moving equipment (11) is defined by two extreme positions, a first position in which the phase offset between the eccentric flyweight rotors is zero, and a second position in which the phase offset is equal to 180°.

16. The device according to claim 13, wherein said device includes at least one servo-motor (19) for servo-controlling a position of said moving equipment (11), a plurality of sensors measuring the positions of said rotors for a purpose of calculating the phase offset between said sets, and a relationship for regulating and servo-controlling rotation of said single motor (12).

17. The device according to claim 13, wherein said controllable moving equipment (11) is a carriage (18) sliding along said axis of symmetry and supporting said single motor (12).

18. The device according to claim 13, wherein said endless connection (14) is a belt that winds around a plurality of pulleys (15) that are mounted on the axes of said rotors, and of said single motor, which pulleys are contained in a common plane.

19. The device according to claim 18, wherein said belt (14) is a cog belt and co-operates with corresponding teeth (15A) formed on said pulleys (15).

20. The device according to claim 13, wherein said controllable moving equipment (11) also includes at least one tensioning wheel (17) for tensioning said endless connection (14).

* * * * *

UNITED STATES PATENT AND TRADEMARK OFFICE
CERTIFICATE OF CORRECTION

PATENT NO. : 7,582,032 B2
APPLICATION NO. : 10/522516
DATED : September 1, 2009
INVENTOR(S) : Manfredotti et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 853 days.

Signed and Sealed this

Fourteenth Day of September, 2010

David J. Kappos
*Director of the United States Patent and Trademark Office*